United States Patent
Ioannou et al.

(10) Patent No.: US 10,824,352 B2
(45) Date of Patent: Nov. 3, 2020

(54) REDUCING UNNECESSARY CALIBRATION OF A MEMORY UNIT FOR WHICH THE ERROR COUNT MARGIN HAS BEEN EXCEEDED

(71) Applicant: INTERNATIONAL BUSINESS MACHINES CORPORATION, Armonk, NY (US)

(72) Inventors: Nikolas Ioannou, Zurich (CH); Nikolaos Papandreou, Thalwil (CH); Roman A. Pletka, Zurich (CH); Sasa Tomic, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/833,797

(22) Filed: Dec. 6, 2017

(65) Prior Publication Data
US 2019/0171381 A1   Jun. 6, 2019

(51) Int. Cl.
G06F 12/02 (2006.01)
G06F 3/06 (2006.01)
G06F 11/07 (2006.01)

(52) U.S. Cl.
CPC .......... *G06F 3/0632* (2013.01); *G06F 3/0604* (2013.01); *G06F 3/0659* (2013.01);
(Continued)

(58) Field of Classification Search
None
See application file for complete search history.

(56) References Cited

U.S. PATENT DOCUMENTS 7,616,499 B2   11/2009   Wan et al.
8,422,303 B2    4/2013   Franca-Neto et al.
(Continued)

FOREIGN PATENT DOCUMENTS

CN   101419843    4/2009
CN   102880554   12/2013
(Continued)

OTHER PUBLICATIONS

Fang et al.; "Efficient Bit Error Rate Estimation for High-Speed Link by Bayesian Model Fusion", 2015 Design, Automation & Test in Europe Conference & Exhibition, pp. 1024-1029.
(Continued)

*Primary Examiner* — Charles Rones
*Assistant Examiner* — Ryan Dare
(74) *Attorney, Agent, or Firm* — Stosch Sabo; Brian F. Russell

(57) ABSTRACT

A controller sets an error count margin for each of multiple units of a non-volatile memory and detects whether the error count margin of any of the multiple units has been exceeded. In response to detecting that the error count margin of a memory unit is exceeded, the controller determines whether calibration of the memory unit would improve a bit error rate of the memory unit sufficiently to warrant calibration. If so, the controller performs calibration of the memory unit. In some implementations, the controller refrains from performing the calibration in response to determining that calibration of the memory unit would not improve the bit error rate of the memory unit sufficiently to warrant calibration, but instead relocates a desired part or all valid data within the memory unit and, if all valid data has been relocated from it, erases the memory unit.

17 Claims, 8 Drawing Sheets

(52) U.S. Cl.
CPC .......... *G06F 3/0679* (2013.01); *G06F 11/073* (2013.01); *G06F 11/076* (2013.01)

(56) References Cited

U.S. PATENT DOCUMENTS

| | | | |
|---|---|---|---|
| 8,579,986 | B1 | 11/2013 | Freeman et al. |
| 8,990,485 | B2 | 3/2015 | Haukness et al. |
| 9,069,688 | B2 | 6/2015 | Chung et al. |
| 9,176,859 | B2 | 11/2015 | Walston et al. |
| 9,361,167 | B2 | 6/2016 | Kealy et al. |
| 9,530,522 | B1 | 12/2016 | Christensen et al. |
| 9,563,504 | B2 | 2/2017 | Liang et al. |
| 9,576,671 | B2 | 2/2017 | Karakulak et al. |
| 9,772,901 | B2 | 9/2017 | Hoekstra et al. |
| 9,805,809 | B1 | 10/2017 | Zhou et al. |
| 9,857,986 | B2 | 1/2018 | Fisher et al. |
| 10,082,962 | B2 | 9/2018 | Fisher et al. |
| 10,140,040 | B1 | 11/2018 | Koudele et al. |
| 10,170,162 | B2 | 1/2019 | Al-Shamma et al. |
| 10,170,195 | B1 | 1/2019 | Ioannou et al. |
| 10,236,067 | B2 | 3/2019 | Fisher et al. |
| 10,453,537 | B1 | 10/2019 | Reuter et al. |
| 10,552,063 | B2 | 2/2020 | Pletka et al. |
| 2007/0263444 | A1 | 11/2007 | Gorobets et al. |
| 2008/0133288 | A1 | 6/2008 | Thibaux et al. |
| 2009/0319859 | A1 | 12/2009 | Alrod et al. |
| 2010/0023800 | A1 | 1/2010 | Harari et al. |
| 2011/0007562 | A1 | 1/2011 | Yip |
| 2012/0226959 | A1 | 9/2012 | Xie et al. |
| 2013/0111113 | A1 | 5/2013 | Harari et al. |
| 2014/0056067 | A1 | 2/2014 | Zhang et al. |
| 2014/0164880 | A1 | 6/2014 | Chen et al. |
| 2014/0229799 | A1 | 8/2014 | Hubris et al. |
| 2016/0041891 | A1 | 2/2016 | Malshe et al. |
| 2016/0103630 | A1 | 4/2016 | Shen |
| 2016/0110124 | A1* | 4/2016 | Camp ................... G06F 3/0619 714/704 |
| 2016/0110248 | A1 | 4/2016 | Camp et al. |
| 2016/0110249 | A1 | 4/2016 | Orme et al. |
| 2016/0170672 | A1 | 6/2016 | Li et al. |
| 2016/0179412 | A1 | 6/2016 | Camp et al. |
| 2017/0003880 | A1* | 1/2017 | Fisher ..................... G06F 3/061 |
| 2017/0091006 | A1 | 3/2017 | Camp et al. |
| 2017/0161142 | A1 | 6/2017 | Reed et al. |
| 2017/0220416 | A1 | 8/2017 | Yao |
| 2017/0358365 | A1 | 12/2017 | Ray et al. |
| 2018/0190362 | A1* | 7/2018 | Barndt ................ G11C 16/3431 |
| 2018/0341413 | A1* | 11/2018 | Lai ........................ G06F 3/0616 |
| 2018/0374549 | A1* | 12/2018 | Padilla ............... G11C 16/3427 |
| 2019/0155749 | A1* | 5/2019 | Hahn .................... G06F 12/126 |
| 2019/0172542 | A1 | 6/2019 | Miladinovic |

FOREIGN PATENT DOCUMENTS

| | | |
|---|---|---|
| CN | 105718206 | 6/2016 |
| EP | 2549482 A1 | 1/2013 |
| EP | 2587362 A3 | 8/2013 |
| WO | 2014088682 A1 | 6/2014 |

OTHER PUBLICATIONS

Neis et al.; "Retention Time Measurements and Modeling of Bit Error Rates of Wide I/O DRAM in MPSoCs", 2015 Design, Automation & Test in Europe Conference & Exhibition, pp. 495-500.

Jimenez et al.; "Phoenix: Reviving MLC Blocks As SLC to Extend NAND Flash Devices Lifetime", 2013.

Fatadin, Irshaad et al.; "Calibration of Estimated BER From Vector Magnitude With Carrier Phase Recovery", Scientific Pages Photonics Opt 1(1):1-6, 2017.

Cai et al.; "Error Analysis and Retention-Aware Error Management for NAND Flash Memory", Intel Technology Journal, vol. 17, Issue 1, 2013.

Yaakobi et al., "Error Characterization and Coding Schemes for Flash Memory", describes bit-level BER, page-level BER measurements and a proposed error correcting scheme (see section III B-C and section IV). 2010 https://cseweb.ucsd.edu/~swanson/papers/ACTEMT2010ECC.pdf.

A. Prodromakis et al., "MLC NAND Flash memory: Aging effect and chip/channel emulation", 2015, describe.measuring BER (see document) https://pdfs.semanticscholar.org/8407/bf47ed375c28a05bd2bb1a9f9c8f4d00cbe3.pdf.

Pletka, Roman A. et al; "Health-Binning: Maximizing the Performance and the Endurance of Consumer-Level NAND Flash." Proceedings of the 9th ACM International on Systems and Storage Conference. ACM, 2016.

Appendix P.

* cited by examiner

REDUCING UNNECESSARY CALIBRATION OF A MEMORY UNIT FOR WHICH THE ERROR COUNT MARGIN HAS BEEN EXCEEDED

BACKGROUND OF THE INVENTION

This disclosure relates to data processing and data storage, and more specifically, to intelligently performing calibration of read threshold voltage(s) for a unit of data storage in a non-volatile memory system. Still more particularly, the disclosure relates to reducing unnecessary calibration for a unit of memory for which an error count margin has been exceeded.

NAND flash memory is an electrically programmable and erasable non-volatile memory technology that stores one or more bits of data per memory cell as a charge on the floating gate of a transistor or a similar charge trap structure. The amount of charge on the floating gate modulates the threshold voltage of the transistor. By applying a proper read voltage and measuring the amount of current, the programmed threshold voltage of the memory cell can be determined, and thus the stored information can be detected. Memories storing one, two, three and four bits per cell are respectively referred to in the art as Single Level Cell (SLC), Multi-Level Cell (MLC), Three Level Cell (TLC), and Quad Level Cell (QLC) memories. In a typical implementation, a NAND flash memory array includes multiple physical die, which can each include multiple planes. These planes in turn each contain multiple blocks (also referred to as "erase blocks") of physical memory, each of which includes multiple physical pages each containing a multiplicity of memory cells. By virtue of the physical arrangement of the word and bit lines utilized to access memory cells, flash memory arrays have generally been programmed on a page basis, but erased on a block basis.

In multi-level (i.e., MLC, TLC and QLC) NAND flash memory, information is stored by programming the memory cells to various quantized threshold voltage levels according to the device's programming algorithm, which maps the binary bit values to discrete threshold voltage levels. In response to a page read command, the binary bit values are retrieved by applying appropriate read voltages that divide the programmed threshold voltage window into discrete regimes and by then applying a reverse mapping between the detected threshold voltage levels and the corresponding binary bit values. Over the lifetime of a multi-level NAND flash memory device, the distributions of programmed threshold voltage generally become degraded due to effects such as wear or retention on the memory cells. Consequently, it is generally desirable to adapt or shift the read voltage thresholds defining the various bit values over time to compensate for these effects and to extend the useful life of the NAND memory device. In addition, the distributions of threshold voltages maybe shift due to various short-term retention effects, so it is generally desirable to temporarily adapt or shift the read voltage thresholds to account for these temporary effects.

BRIEF SUMMARY

In general, the effects of wear on a physical page of memory are manifested through an increase in the bit error rate (BER) observed for the physical page over time. As indicated above, the BER of the physical page can be improved by applying appropriate threshold voltage shift (TVS) for the read voltage threshold(s) of the physical page, where the amount of each TVS is based on what TVS value minimizes the BER. Compared to reading with nominal TVS values. By adapting read voltage thresholds in this manner, performance and device longevity are both improved.

In some non-volatile memories, a controller determines to calibrate (adapt) the TVSs of a unit of memory in response to determining that an error count margin (ECM) representing the maximum acceptable error count for that memory unit has been exceeded. In general, the controller sets the ECM to reflect the maximum expected increase in the BER based on the effects of retention, read disturbs, and program/erase cycles while potentially taking into account the error correction capability of the error correction code (ECC) scheme. Thus, if the controller determines that the ECM for a memory unit (e.g., a block) is exceeded, the controller will recalibrate the TVSs for the block.

The present application appreciates that some newer non-volatile memory technologies may have transient operating states in which a physical page of memory may exhibit a temporarily elevated BER. For example, a physical page of three-dimensional (3D) NAND flash memory may experience effects from static electric charge build up when a block is not read for a certain amount of time resulting in a temporarily elevated BER. Hence, when the physical page is first read after a relatively short (e.g., on the order of several minutes) time interval elapses without a read being made to the block containing that physical page, the measured BER may be higher than another read to the same page under different conditions where reads to the block containing the page occurred recently. This higher BER not only falsifies the observed wear, but may result in a situation where the ECC cannot correct the large number of errors. After a read is made to the block containing the physical page, the physical page then abruptly returns to a lower BER. A physical page of 3D NAND flash memory also exhibits a temporarily elevated BER when the physical page is first read following multiple consecutive block erases in the same plane without any intervening read. Again, the elevated BER attributable to this type of interference can be mitigated by performing a read to the block containing the physical page. An operating state of a physical page (or other memory unit) exhibiting only temporarily elevated BER is referred to herein as a Higher BER State (HBS). In a typical operating scenario, after reading one or more pages from a block in a HBS and waiting for some finite amount of time (e.g., 100 ms to seconds), the block (and the physical pages it contains) transitions from the EMS into a Lower BER State (LBS) in which the observed BER accurately reflects the effects of wear on the block.

The present application appreciates that, in newer non-volatile memory technologies such as 3D NAND flash, if a block exhibits an elevated BER due to retention or read disturb effects or static electric charge build up, and consequently exceeds the ECM, the block may not benefit from re-calibration as the TVS values may already be optimal (or close enough to the optimal). Further, because the effects of static electric charge build up, read disturbs, and data retention are only transient, the intrinsic health of the block remains unchanged. In such cases, it is unnecessary and undesirable for the controller to perform block calibration or to make an unjustified reduction in the health of the block.

In view of the foregoing, in at least one embodiment, a controller reduces unnecessary calibration in cases in which the ECM of a unit of memory is exceeded. The controller initially sets an error count margin for each of multiple units of a non-volatile memory and detects whether the error count margin of any of the multiple units has been exceeded. In response to detecting that the error count margin of a memory unit is exceeded, the controller determines whether calibration of the memory unit would improve a bit error rate of the memory unit sufficiently to warrant calibration. If so, the controller performs calibration of the memory unit. In some implementations, the controller refrains from performing the calibration in response to determining that calibration of the memory unit would not improve the bit error rate of the memory unit sufficiently to warrant calibration, but instead relocates a desired part of the valid data within the memory unit and, if all valid data has been relocated from it, erases the memory unit.

DETAILED DESCRIPTION

Figure 1A:
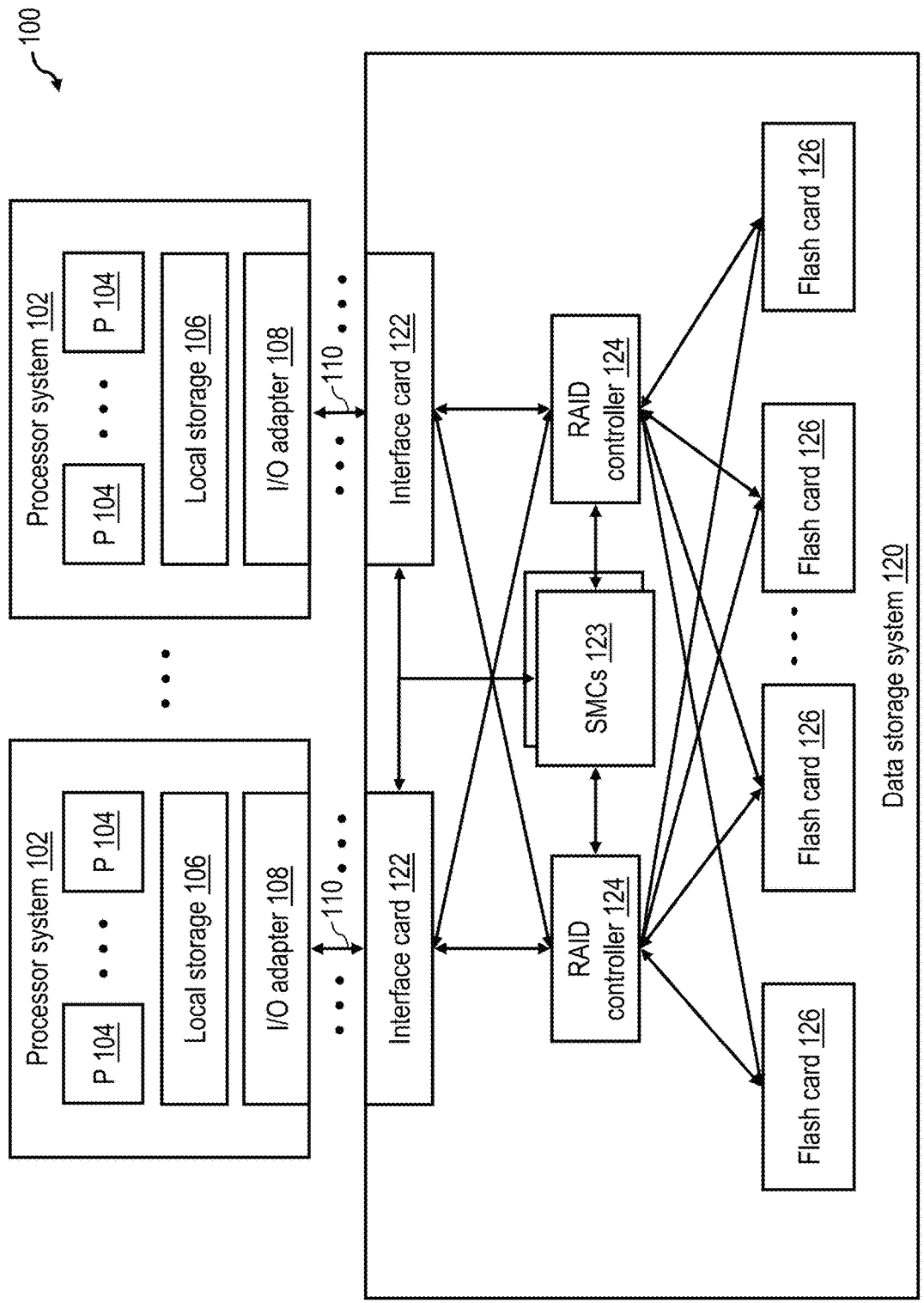
FIG. 1A is a high level block diagram of a data processing environment in accordance with one embodiment.

With reference to the figures and with particular reference to FIG. 1A, there is illustrated a high level block diagram of an exemplary data processing environment 100 including a data storage system 120 having a non-volatile memory array as described further herein. As shown, data processing environment 100 includes one or more hosts, such as a processor system 102 having one or more processors 104 that process instructions and data. A processor system 102 may additionally include local storage 106 (e.g., dynamic random access memory (DRAM) or disks) that may store program code, operands and/or execution results of the processing performed by processor(s) 104. In various embodiments, a processor system 102 can be, for example, a mobile computing device (such as a smartphone or tablet), a laptop or desktop personal computer system, a server computer system (such as one of the POWER series of servers available from International Business Machines Corporation), or a mainframe computer system. A processor system 102 can also be an embedded processor system using various processors such as ARM, PowerPC, Intel X86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In some embodiments, data storage system 120 may be integral to a processor system 102. In various embodiments, I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), Nonvolatile Memory Express (NVMe), NVMe over Fabrics, etc. I/O operations (operations) communicated via I/O channel 110 include read operations by which a processor system 102 requests data from data storage system 120 and write operations by which a processor system 102 requests storage of data in data storage system 120.

Although not required, in the illustrated embodiment, data storage system 120 includes multiple interface cards 122 through which data storage system 120 receives and responds to input/output operations (operation) of hosts via I/O channels 110. Each interface card 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to non-volatile storage media, which in the illustrated example include multiple flash cards 126 bearing NAND flash memory. In other embodiments, alternative and/or additional non-volatile storage devices can be employed.

In the depicted embodiment, the operation of data storage system 120 is managed by redundant system management controllers (SMCs) 123, which are coupled to interface cards 122 and RAID controllers 124. In various embodiments, system management controller 123 can be implemented utilizing hardware or hardware executing firmware and/or software.

Figure 1B:
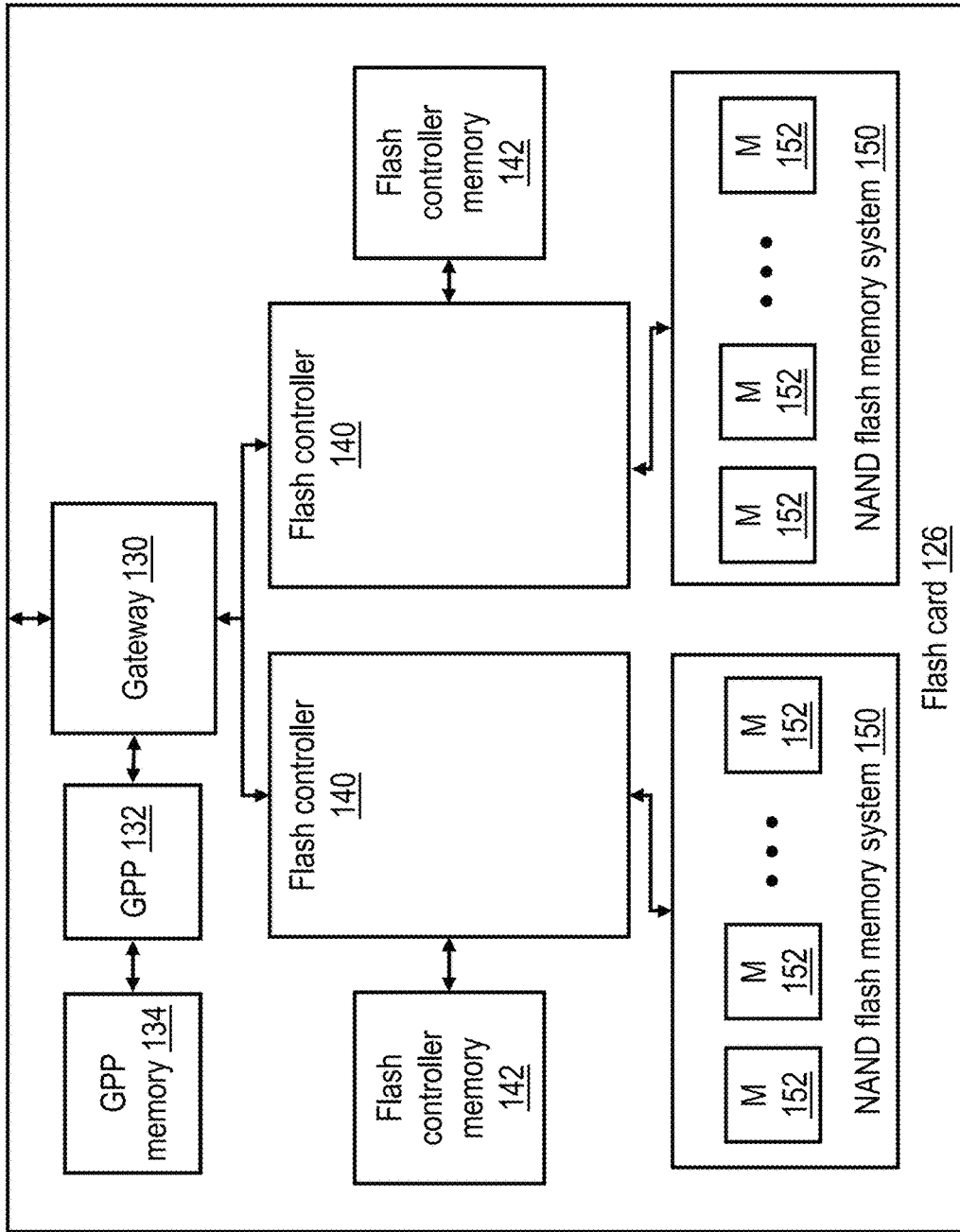
FIG. 1B is a more detailed block diagram of a flash card of the data storage system of FIG. 1A.

FIG. 1B depicts a more detailed block diagram of an exemplary embodiment of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform pre-processing on operations received by gateway 130 and/or to schedule servicing of the operations by flash card 126. GPP 132 is coupled to a GPP memory 134 (e.g., Dynamic Random Access Memory (DRAM)) that can conveniently buffer data created, referenced and/or modified by GPP 132 in the course of its processing or data flowing through the gateway 130 destined for one or more of the flash controllers 140.

Gateway 130 is further coupled to multiple flash controllers 140, each of which controls a respective NAND flash memory system 150. Flash controllers 140 can be implemented, for example, by an Application Specific Integrated Circuit (ASIC) and/or a Field Programmable Gate Array (FPGA) and/or a microprocessor, and each have an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write operations from gateway 130 that request to read data stored in NAND flash memory system 150 and/or to store data in NAND flash memory system 150. Flash controllers 140 service these operations, for example, by accessing NAND flash memory system 150 to read or write the requested data from or into NAND flash memory system 150 or by accessing a memory cache (not illustrated) associated with NAND flash memory system 150.

Flash controllers 140 implement a flash translation layer (FTL) that provides logical-to-physical address translation to enable access to specific memory locations within NAND flash memory systems 150. In general, an operation received by flash controller 140 from a host device, such as a processor system 102, contains the logical block address (LBA) at which the data is to be accessed (read or written) and, if a write operation, the write data to be stored to data storage system 120. The operation may also specify the amount (or size) of the data to be accessed. Other information may also be communicated depending on the protocol and features supported by data storage system 120. The flash translation layer translates LBAs received from a RAID controller 124 into physical addresses assigned to corresponding physical location in NAND flash memory systems 150. Flash controllers 140 may perform address translation and/or store mappings between logical and physical addresses in a logical-to-physical translation data structure, such as a logical-to-physical translation table (LPT), which may conveniently be stored in flash controller memory 142.

NAND flash memory systems 150 may take many forms in various embodiments. In the embodiment shown in FIG. 1B, each NAND flash memory system 150 includes multiple (e.g., 32) individually addressable NAND flash memory storage devices 152. In the illustrated example, the flash memory storage devices 152 take the form of a board-mounted flash memory modules, for example, Multi-Level Cell (MLC), Three Level Cell (TLC), or Quad Level Cell (QLC) 3D NAND flash memory modules. The effective storage capacity provided by flash memory storage devices 152 can be increased through the implementation of data compression, for example, by flash controllers 140 and/or high level controllers, such as GPPs 132, RAID controllers 124 or SMCs 123.

Figure 2:
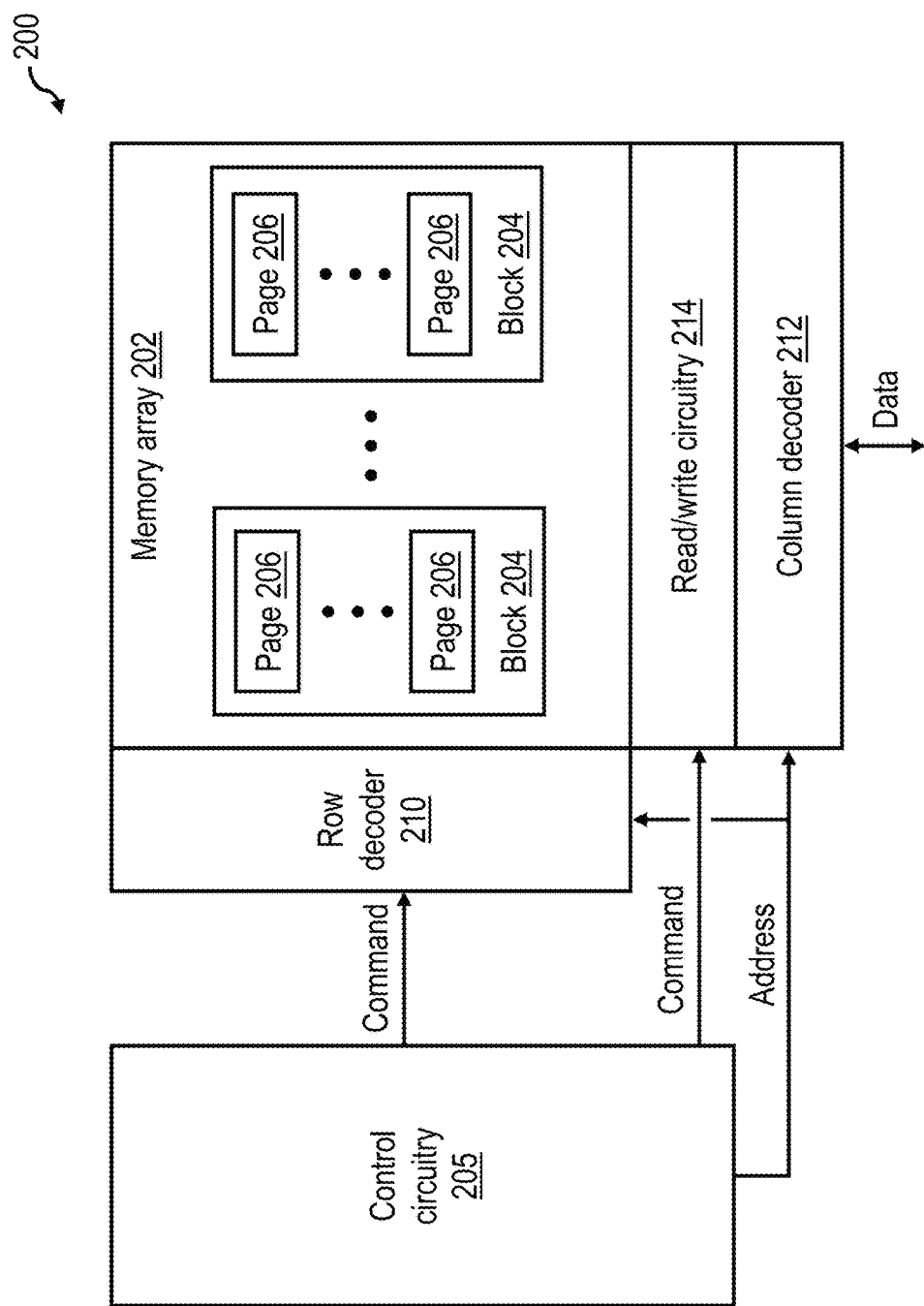
FIG. 2 depicts an exemplary NAND flash memory module in accordance with one embodiment.

Referring now to FIG. 2, there is depicted a block diagram of an exemplary flash memory module 200 that can be utilized to implement any of the NAND flash memory storage devices 152 of FIG. 1B. Flash memory module 200 includes one or more memory die, each implementing at least one memory array 202, for example, formed of a 3D NAND flash memory cells. As indicated in FIG. 2, the memory cells within memory array 202 are physically arranged in multiple blocks 204, each in turn including multiple physical pages 206.

As is known to those skilled in the art, NAND flash memory, such as that employed in memory array 202, must be erased prior to being programmed. Further, NAND flash memory can be (but is not required to be) constrained by its construction such that the smallest granule of storage that can be erased is a block 204 and the smallest granule of storage that can be accessed by a read or write operation is fixed at the size of a single physical page 206. It should be appreciated in this regard that the LBAs provided by host devices correspond to logical pages within a logical address space, where each logical page typically has a size of 4 kilobytes (kB). Physical pages 206, in contrast, typically have a larger size, for example, 16 kB, and can thus correspond to multiple logical pages.

Flash memory module 200 further includes a row decoder 210 through which word lines of memory array 202 can be addressed and a column decoder 212 through which bit lines of memory array 202 can be addressed. In addition, flash memory module 200 includes read/write circuitry 214 that enables the memory cells of a physical page 206 to be programmed or read in parallel. Flash controller 200 additionally includes control circuitry 205 that provides chip-level control of operation of memory array 202, including read and write accesses made to physical pages 206 in memory array 202, erasure of blocks 204, and the amplitude, duration and polarity of related voltages applied to memory array 202.

Having described the general physical structure of one exemplary embodiment of a data storage system 120, certain operational aspects of data storage system 120 are now described with reference to FIG. 3, which is a high level flow diagram of the flash management functions and data structures employed by a GPP 132 and/or flash controller 140 in accordance with one embodiment.

Data storage system 120 does not generally allow external devices (e.g., hosts) to directly address and/or access the physical memory locations within NAND flash memory systems 150. Instead, data storage system 120 is generally configured to present to host devices one or more logical volumes each having a contiguous logical address space, thus allowing host devices to read and write data to and from logical block addresses (LBAs) within the logical address space while permitting one or more of the various levels of controllers (e.g., system management controller 123, RAID controllers 124, flash controllers 140 and GPP 132) to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 performs logical-to-physical address translation for an associated set of LBAs using a logical-to-physical address translation data structure, such as logical-to-physical translation (LPT) table 300, which can be stored, for example, in the associated flash controller memory 142. It should be noted that the logical address supplied to flash controller(s) 140 may be different from the logical address originally supplied to data storage system 120, since various components within data storage system 120 may perform address translation operations between the external devices and the flash controller(s) 140.

Flash management code running on the GPP 132 tracks erased blocks of NAND flash memory system 150 that are ready to be used in ready-to-use (RTU) queues 306, which may be stored, for example, in GPP memory 134. In the depicted embodiment, flash management code running on the GPP 132 maintains one RTU queue 306 per channel (i.e., per data bus), and an identifier of each erased block that is to be reused is enqueued in the RTU queue 306 corresponding to its channel. A build block stripes function 320 performed by flash management code running on the GPP 132 constructs new block stripes for storing data and associated parity information from the erased blocks enqueued in RTU queues 306. The new block stripes are then queued to the flash controller 140 for data placement. Block stripes are preferably formed of blocks residing in different channels, meaning that build block stripes function 320 can conveniently construct a block stripe by drawing each block of the new block stripe from a different RTU queue 306. In general, build block stripes function 320 attempts to construct stripes from blocks of approximately equal health (i.e., expected remaining useful life).

In response to write operation received from a host, such as a processor system 102, a data placement function 310 of flash controller 140 determines by reference to LPT table 300 whether the target LBA(s) indicated in the write request is/are currently mapped to physical memory page(s) in NAND flash memory system 150 and, if so, changes the status of each data page currently associated with a target LBA to indicate that the associated data is no longer valid. In addition, data placement function 310 allocates a page stripe if necessary to store the write data of the write operation and any non-updated data (i.e., for write requests smaller than a logical page, the remaining valid data from a previous write to the same logical address which is not being overwritten and which must be handled in a read-modify-write manner) from an existing page stripe, if any, targeted by the write operation, and/or stores the write data of the write operation and any non-updated (i.e., still valid) data from an existing page stripe, if any, targeted by the write operation to an already allocated page stripe which has free space left. The page stripe may be allocated from either a block stripe already allocated to hold data or from a new block stripe built by build block stripes function 320. In a preferred embodiment, the page stripe allocation can be based on the health of the blocks available for allocation and the "heat" (i.e., estimated or measured write access frequency) of the LBA of the write data. Data placement function 310 then writes the write data, associated metadata (e.g., cyclic redundancy code (CRC) and error correcting code (ECC) values), and parity information for the page stripe in the allocated page stripe. Flash controller 140 also updates LPT table 300 to associate the physical page(s) utilized to store the write data with the LBA(s) indicated by the host device. Thereafter, flash controller 140 can access the data to service host read operations by reference to LPT table 300 as further illustrated in FIG. 3.

Once all pages in a block stripe have been written, flash controller 140 places the block stripe into one of occupied block queues 302, which flash management code running on the GPP 132 utilizes to facilitate garbage collection. As noted above, through the write process, pages are invalidated, and therefore portions of the NAND flash memory system 150 become unused. The associated flash controller 140 (and/or GPP 132) eventually needs to reclaim this space through garbage collection performed by a garbage collector 312. Garbage collector 312 selects particular block stripes for garbage collection based on a number of factors including, for example, the health of the blocks 204 within the block stripes and how much of the data within the erase blocks 204 is invalid. In the illustrated example, garbage collection is performed on entire block stripes, and flash management code running on GPP 132 logs the block stripes ready to be recycled in a relocation queue 304, which can conveniently be implemented in the associated flash controller memory 142 or GPP memory 134.

The flash management functions performed by GPP 132 or flash controller 140 additionally include a relocation function 314 that relocates the data held in block stripes enqueued in relocation queue 304. To relocate such data, relocation function 314 updates LPT table 300 to remove the current association between the logical and physical addresses of the data. In addition, relocation function 314 issues relocation write requests to data placement function 310 to request that the valid data of the old block stripe be written to a new block stripe in NAND flash memory system 150. Once all remaining valid data has been moved from the old block stripe, the old block stripe is passed to dissolve block stripes function 316, which decomposes the old block stripe into its constituent blocks 204, thus disassociating the blocks 204. Each of the blocks 204 formerly forming the dissolved block stripe is then erased under the direction of flash controller 140 and/or the control circuitry 205 of the relevant flash memory module 200, and a corresponding program/erase (P/E) cycle count 334 for each erased block is incremented. Based on the health metrics 332 of each erased block 204 (e.g., bit error rate (BER) metrics, uncorrectable errors, P/E cycle count, etc.), each erased block 204 is either retired (i.e., withdrawn from use) by a block retirement function 318 among the flash management functions executed on GPP 132, or alternatively, prepared for reuse by placing the block 204 on the appropriate ready-to-use (RTU) queue 306 in the associated GPP memory 134.

Figure 3:
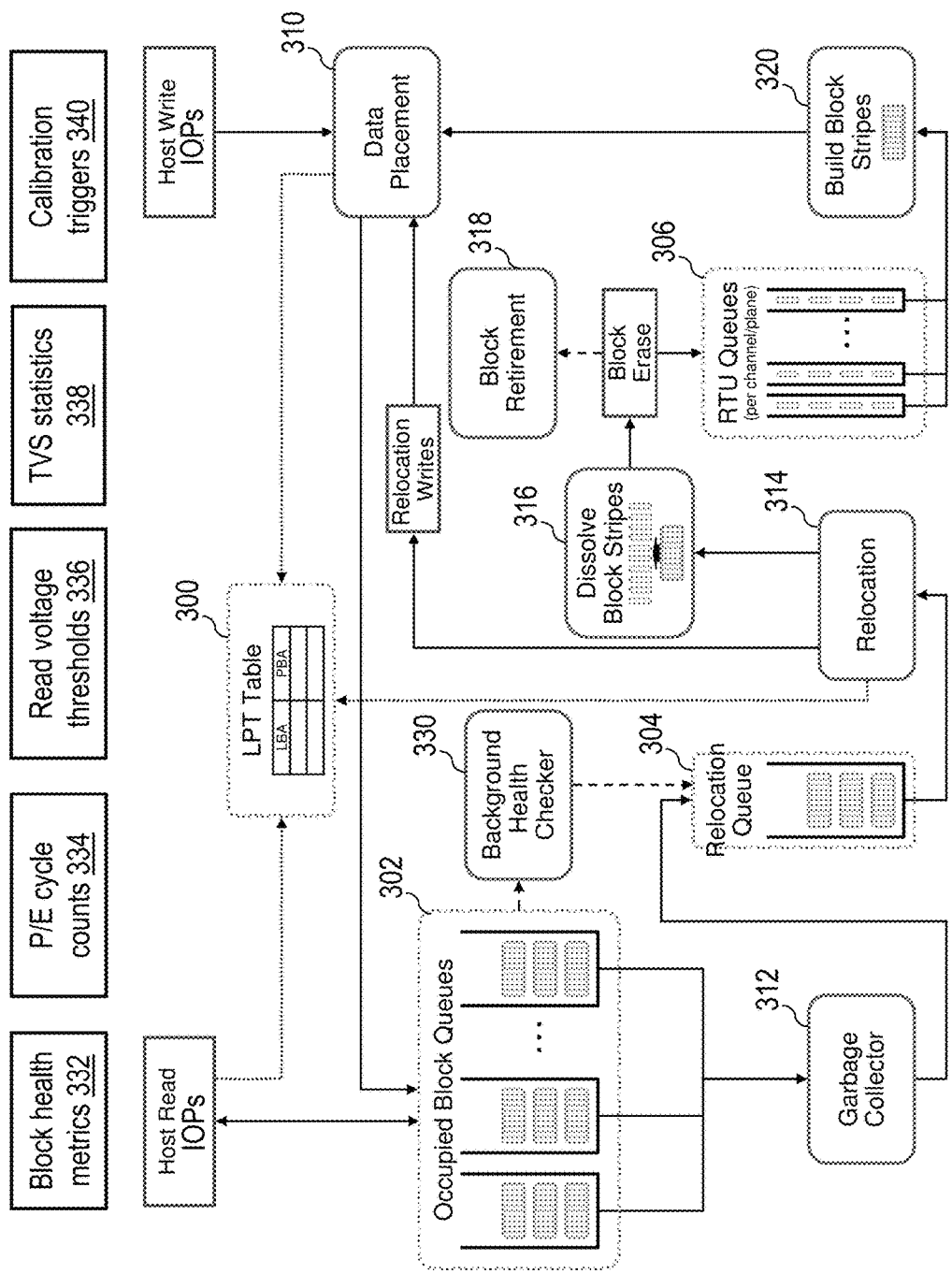
FIG. 3 is a high level flow diagram of the flash management functions and data structures employed in flash management in accordance with one embodiment.

As further shown in FIG. 3, the flash management functions executed on GPP 132 and/or flash controller 140 additionally include a background health checker 330. Background health checker 330, which operates independently of the read and write operations of hosts such as processor systems 102, continuously determines one or more block health metrics 332 for blocks belonging to block stripes recorded in occupied block queues 302. Based on the one or more of the block health metrics 332, background health checker 330 places block stripes on relocation queue 304 for handling by relocation function 314. Key block health metrics 332 preferably monitored and recorded by background health checker 330 relate to the bit error rate (BER) metrics observed for valid blocks and physical pages, and may include, for example, the worst page BER of each block, the mean page BER of each block, the rates of change of the worst page BER and mean page BER of each block, etc. In order to obtain the most accurate health estimate possible, health can be determined from an analysis of valid and invalid data, thereby ensuring that blocks containing almost entirely invalid data are fully analyzed to determine overall block health.

As described in greater detail below, one function of GPP 132 and/or flash controller 140 that can be incorporated within background health checker 330 or that can be separately implemented is the periodic adaptation (calibration) of read voltage thresholds 336 utilized to decode the data bits stored within the memory cells of memory arrays 202. These read voltage thresholds 336, which can be individually defined to any desired level of granularity (e.g., per-page, per page group within a block, per block, etc.), are preferably selected to improve one or more bit error metrics for the data contained in the memory granules. As further depicted in FIG. 3, GPP 132 and/or flash controller 140 preferably track additional TVS statistics 338 to facilitate intelligent adaptation of read voltage thresholds 336. TVS statistics 338 can include read counts indicating a number of times a given memory unit (e.g., page, page group, and/or block) has been read since being programmed, an interval since an immediately previous read to a given memory unit (e.g., block), a number of consecutive block erases to a same plane without an intervening read, etc. In addition, GPP 132 and/or flash controller 140 can maintain calibration triggers 340, such as per-memory unit counters indicating an elapsed amount of time since read voltage thresholds of that memory unit were adapted, and/or per-block counters indicating a number of program/erase cycles that each block has been subjected to since the read voltage thresholds for that block were last adapted, and/or per-memory unit error count margin (ECM) indicating a threshold number of errors on a read operation.

Figure 4:
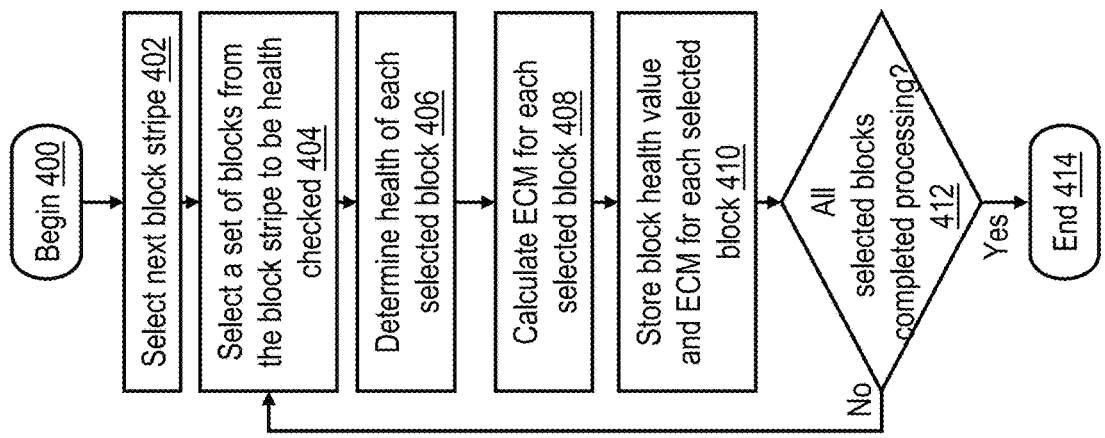
FIG. 4 is a high level logical flowchart of an exemplary background health check process in accordance with one embodiment.

Referring now to FIG. 4, there is illustrated an exemplary high level logical flowchart of an exemplary background health check process in accordance with one embodiment. The process can be performed, for example, by background health checker 330 on an iterative basis.

The process of FIG. 4 begins at block 400 and then proceeds to block 402, which depicts background health checker 330 selecting a first or next block stripe for processing from occupied block queue 302. In general, any block stripe may be chosen, and the selection may be based on one or more criteria, such as elapsed time since last background health check, an elapsed time since last programming, elapsed time since last read access, ordering in a management queue, etc. At block 404, background health checker 330 additionally selects a desired set of the blocks for processing in the selected block stripe. Again, the selection may be based on one or more criteria, such as whether blocks have seen elevated error counts, elapsed time since last programming, elapsed time since last read access, elapsed time since last calibration, etc. In a preferred embodiment, the selected set of blocks is processed in parallel. In another embodiment, where the selected set of blocks cannot be processed in parallel, they may be processed in some particular order, for example based on their order in the block stripe.

Background health checker 330 then determines the health of each selected block, as illustrated at block 406. The health of a block (also referred to herein as the "block health") may correspond to or be calculated based upon one or more health metrics, such as the number of errors of the worst ECC codeword in the block, the program/erase cycle count of the block, read/program/erase latencies, and/or other health-related factors. In at least one preferred embodiment, the block health is determined by background health checker 330 based upon the BER observed from page read operations utilizing optimal threshold voltage shift (TVS) values, which may be calibrated as part of the background health check process.

As shown at block 408, background health checker 330 additionally determines the ECM for each selected block. As noted above, the ECM represents the maximum acceptable error count for the block. Thus, if the error count observed for a read operation to the block exceeds the ECM, a controller may take one or more management actions, as described further below with reference to FIGS. 5-7.

It should be noted that the ECM is preferably set higher than the current maximum error count of the worst codeword in any physical page in the block and is typically lower than the block retirement error count limit at which a block will be withdrawn (retired) from use. Only toward the end of the life of the block will the ECM eventually reach the block retirement error count limit. According to some embodiments, the ECM may be calculated as the error count equivalent to the current block health value of the corresponding block plus a predetermined percentage of the error count equivalent of the current block health. The percentage added to the error count margin may be from about 10% to about 50% of the current error count equivalent of the block health value, but may be higher or lower depending on block state information, as described further herein. In a preferred embodiment, the ECM of each block is individually and independently updated over time on a periodic basis. In other words, the ECM of each block may be individually examined and updated to accurately represent a current condition of the block.

In a preferred embodiment, the ECM can be determined based on (e.g., as a sum of) multiple components. For example, in one embodiment the ECM for a memory unit, such as a block, is composed of a long term ECM component that reflects permanent changes in the BER of the block (e.g., due to wear caused by program/erase cycling) and a short term ECM component that reflects transient changes in the BER of the block (e.g., due to retention effects, read disturb effects of reads to the block, read aggression effects (i.e., from reads to adjacent blocks), etc.). The long term ECM component is preferably determined based on at least the BER obtained for a read operation made shortly after programming of the block and with no more than a small number of reads (e.g., five or less) having been made to the block. Because the long term ECM can be determined only infrequently from the BER measured from a freshly programmed block, the long term ECM of a block can also be determined based on block health metrics 332, characterization data, a history of observed BERs and/or past ECMs for the block, and/or various "block state information," including:

data retention time;
    accumulated number of reads of the block since last programmed;
    accumulated number of reads of pages in the block since last programmed;
    accumulated number of reads of page groups in the block since last programmed;
    accumulated number of reads to the block while being partially programmed;
    accumulated number of reads to neighboring blocks;
    block BER state (e.g., HBS or LBS);
    sweep count/retention time of the block;
    time elapsed between the programming of the first and last pages;
    block programming state (e.g., block is partially programmed or fully programmed); and/or
    time elapsed since block was last read.

The short term ECM component can similarly be determined at block 408 from characterization data and/or the foregoing block state information.

Background health checker 330 stores the determined health of each selected block in block health metrics 332 and stores the ECM for each selected block in calibration triggers 340 (block 410). At block 412, background health checker 330 determines whether or not all blocks in the selected block stripe have been processed. Block 412 may further include selecting previously unselected blocks in the block stripe due to new elevated error counts detected since the initial selection was made at block 404. If not, the process of FIG. 4 returns to block 404, which has been described. If, however, background health checker 330 determines at block 412 that all selected blocks in the selected block stripe completed processing and no other blocks in the selected block stripe need to be processed, the process of FIG. 4 ends at block 414 until a next iteration of the background health check process. It should be appreciated that although FIG. 4 depicts an embodiment applicable to data storage systems that manage blocks in block stripes, alternative embodiments (for example, embodiments that do not organize blocks into block stripes) may traverse the blocks in the pool of occupied block queues, block-by-block or any other meaningful order that will be apparent to a person skilled in the art.

Figure 5:
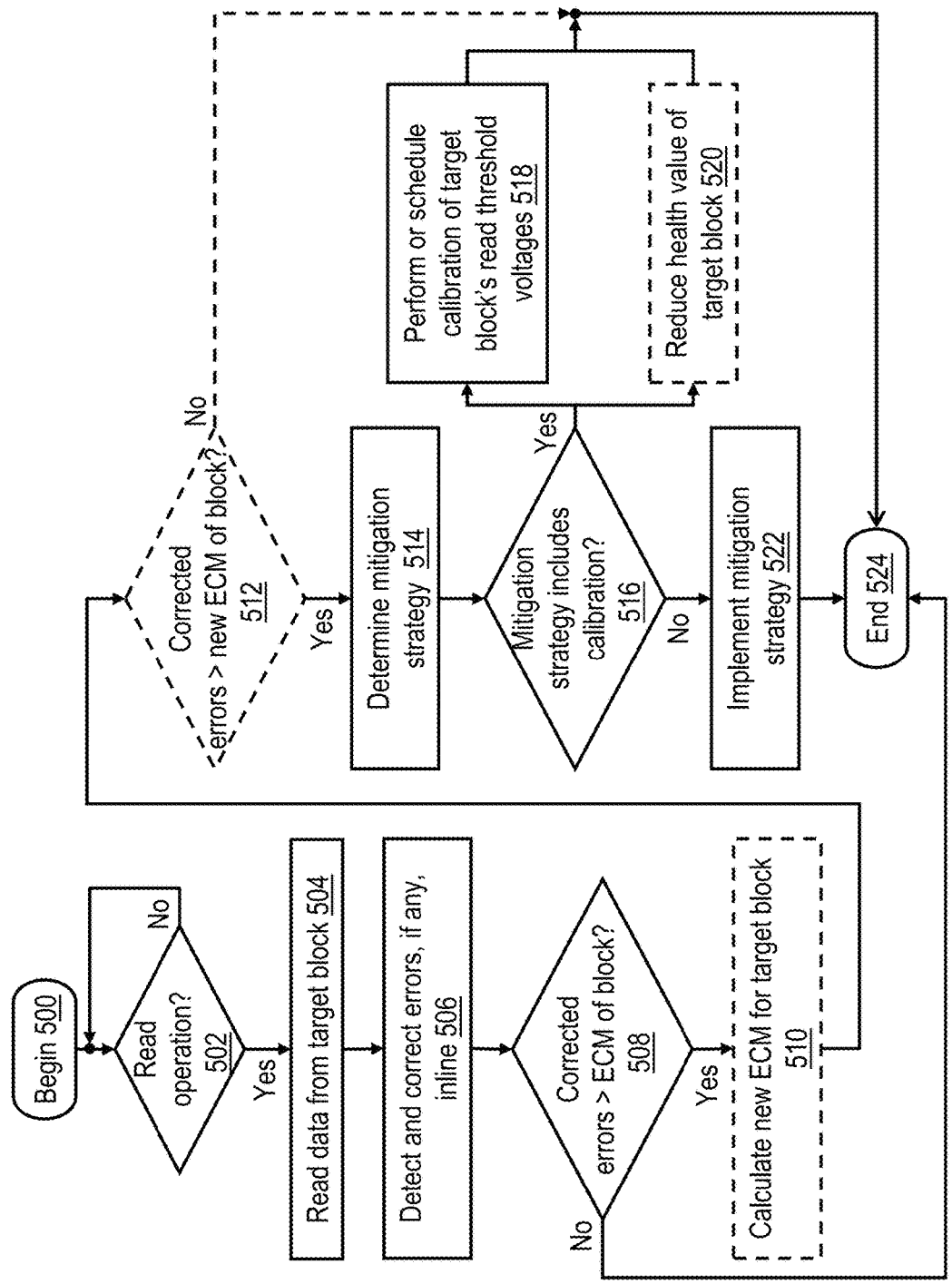
FIG. 5 is a high level logical flowchart of a first exemplary process for mitigating errors when the erase count margin is exceeded in accordance with one embodiment.

Referring now to FIG. 5, there is depicted a high level logical flowchart of a first exemplary process for mitigating errors when the erase count margin is exceeded in accordance with one embodiment. Although the illustrated process can be performed by GPP 132 and/or flash controller 140 in various embodiments (which can individually or collectively be referred to as a "controller"), in the following description the process of FIG. 5 (and the additional embodiments given in FIGS. 6-7) will be described as being performed by flash controller 140 for ease of description.

The process of FIG. 5 begins at block 500 and then proceeds to block 502, which illustrates flash controller 140 determining if a read operation, such as a host read operation or a relocation read operation, has been received. If not, the process iterates at block 502. If, however, flash controller 140 determines at block 502 that a read operation has been received, flash controller 140 translates the logical address specified in the read operation into a physical address by reference to LPT table 300 and reads the page(s) of requested data from the target block identified by the physical address (block 504). As indicated in block 506, any errors in the data read from the target block is corrected inline, for example, using ECC.

Flash controller 140 determines at block 508 whether or not the number of corrected errors in the requested data exceeds the current ECM for the block. If not, no mitigation action (e.g., calibration of the read voltage thresholds of the block or other mitigation) is required, and the process of FIG. 5 ends at block 524. In response to flash controller 140 determining at block 508 that the number of corrected errors in the requested data does exceed the current ECM for the block, the process passes to optional blocks 510 and 512 in some embodiments. In other embodiments, blocks 510-512 may be omitted, and the process may pass directly from block 508 to block 514.

Referring now to block 510, in response the flash controller 140 determining that the ECM for the target block, which may have been determined, for example, by a previous iteration of background health checker 330 at block 408 of FIG. 4, has been exceeded, flash controller 140 determines a new (updated) ECM for the target block on-demand. Flash controller 140 can calculate the new ECM for the target block based on some or all of block health metrics 332, characterization data, a history of observed BERs and/or past ECMs for the block, and/or some or all of the block state information discussed above with reference to block 408. Flash controller 140 can then determine at block 512 whether or not the error count detected at block 506 exceeds the new ECM calculated at block 510. In response to flash controller 140 determining at block 512 that the error count does not exceed the new ECM, no mitigation action is required, and the process of FIG. 5 ends at block 524. However, if the number of corrected errors exceeds the new ECM of the target block, the process proceeds to block 514.

Block 514 illustrates flash controller 140 determining a mitigation strategy that appropriately mitigates the ECM of the target block being exceeded. In various embodiments, the mitigation strategy can vary, and can include one or more of a variety of possible management actions including, for example, performing immediate (on-demand) calibration of the read voltage thresholds of the target block, scheduling subsequent calibration of the target block (e.g., on a subsequent iteration of background health checker 330), performing a dummy read to one or more physical pages of the target block, relocating all or some of the still valid data of the target block, relocating still valid data of the target block from physical pages known to exhibit higher BER, erasing and recycling the target block for subsequent use, etc. Flash controller 140 can select the mitigation strategy at block 514 based on one or more criteria, which can include the amount of errors (e.g., in percentage or number) by which the ECM is exceeded, the amount of error reduction (e.g., in percentage or number) that is projected based on performing one or more mitigation actions, and/or one or more components of the current block state information for the target block. As indicated at block 516, if the mitigation strategy selected at block 516 includes calibration (whether on-demand or scheduled), the process proceeds to blocks 518 and 520, which are described below. If, on the other hand, the mitigation strategy does not include calibration, the process passes to block 522, which illustrates flash controller 140 implementing the mitigation strategy selected at block 514. Thereafter, the process of FIG. 5 ends at block 524.

Referring now to block 518, in response to determining that the mitigation strategy includes calibration, flash controller 140 either performs the calibration immediately or schedules a future calibration of the target block's read threshold voltages. As further illustrated at block 520, flash controller 140 may also optionally reduce a health value of the target block maintained, for example, in block health metrics 332. Following block 518 and/or block 520, the process may either end at block 524, or in some embodiments, may instead pass to block 522 to perform one or more additional mitigation actions prior to ending at block 524.

Figure 6:
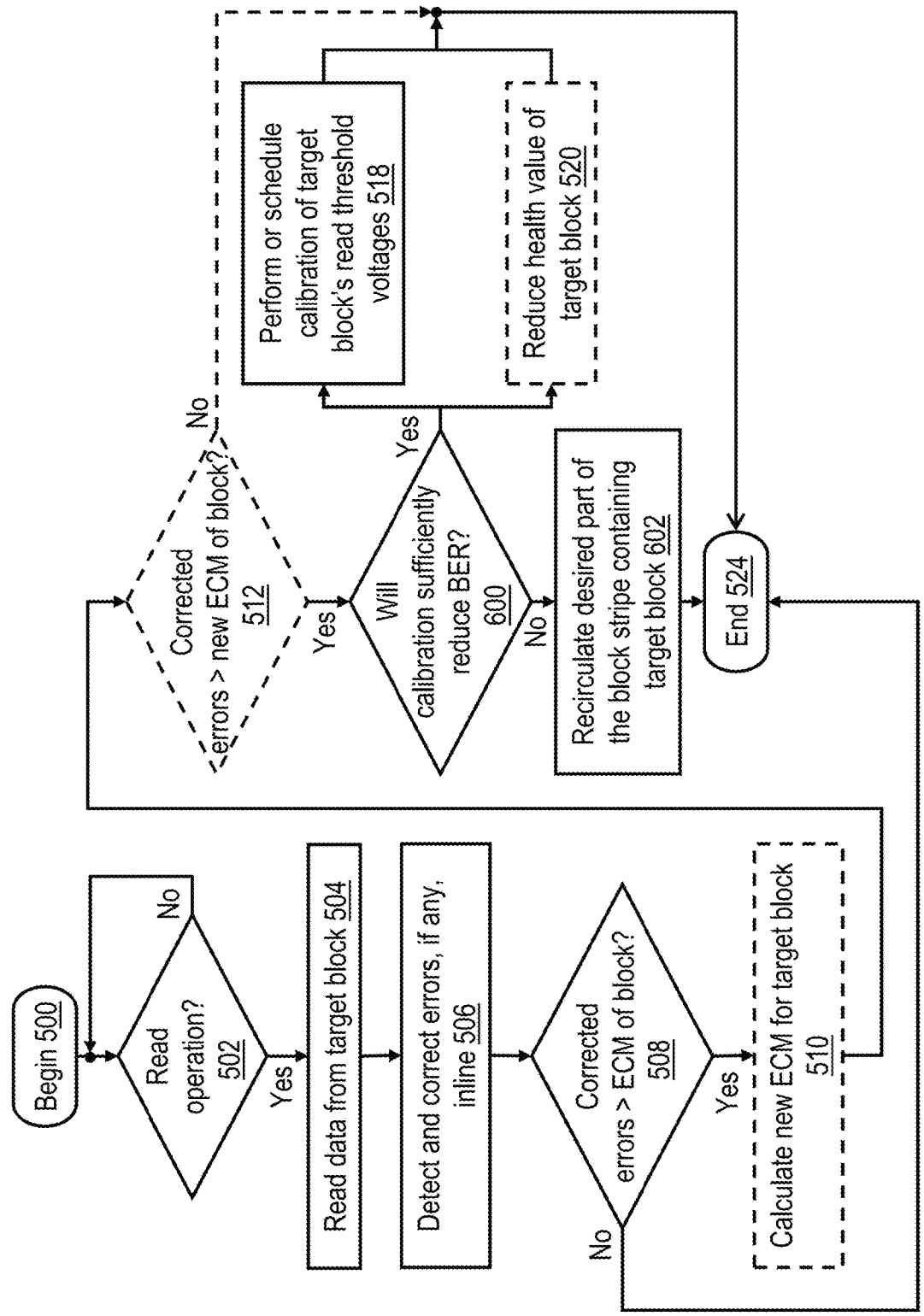
FIG. 6 is a high level logical flowchart of a second exemplary process for mitigating errors when the erase count margin is exceeded in accordance with one embodiment.

Referring now to FIG. 6, there is depicted a high level logical flowchart of a second exemplary process for mitigating errors when the erase count margin is exceeded in accordance with one embodiment. The process of FIG. 6 can be implemented as an exemplary embodiment of the process given in FIG. 5; accordingly, in FIG. 6, like reference numerals are utilized to identify steps corresponding to those depicted in FIG. 5. Thus, blocks 500-512, 518-520, and 524 correspond to the previously described like-numbered blocks of FIG. 5.

In FIG. 6, in response to an affirmative determination at block 512 (or in response to an affirmative determination at block 508 if optional blocks 510-512 are omitted), flash controller 140 determines at block 600 whether or not calibration of the read voltage thresholds of the target block will sufficiently reduce the BER warrant calibration of the target block. In various embodiments, the determination illustrated at block 600 may include whether the calibration is likely to provide any improvement to the BER, whether the calibration is likely to provide at least a predetermined amount of improvement to the BER, and/or whether the calibration is likely to improve the BER enough to meet the ECM for the target block. Flash controller 140 may make the determination illustrated at block 600, for example, based on one or more of characterization data, the amount that the errors exceeded the ECM, the recent calibration history of the block, and/or one or more other components of the current block state information for the target block. In response to determining at block 600 that calibration of the target block will sufficiently reduce the BER to warrant calibration, the process of FIG. 6 passes from block 600 to blocks 518-520, which have been described. If, however, flash controller 140 determines at block 600 that calibration will not sufficiently reduce the BER of the target block to warrant calibration, flash controller 140 relocates a desired part of the target block, which for embodiments that allocate memory in block stripes, means that flash controller 140 relocates a plurality of page stripes from the block stripe containing the target block (block 602). Of course, in embodiments in which memory is not allocated on a stripe basis, flash controller 140 can relocate just a desired part or the entire target block. As shown in FIG. 3, flash controller 140 can relocate the desired part or the entire target block (or the block stripe containing the target block) by invoking relocation function 314 to relocate any still-valid data, erasing the target block if there is no valid data left on the target block, and in that case, returning the target block to RTU queues 306. Following either blocks 518-520 or block 602, the process of FIG. 6 ends at block 524.

Figure 7:
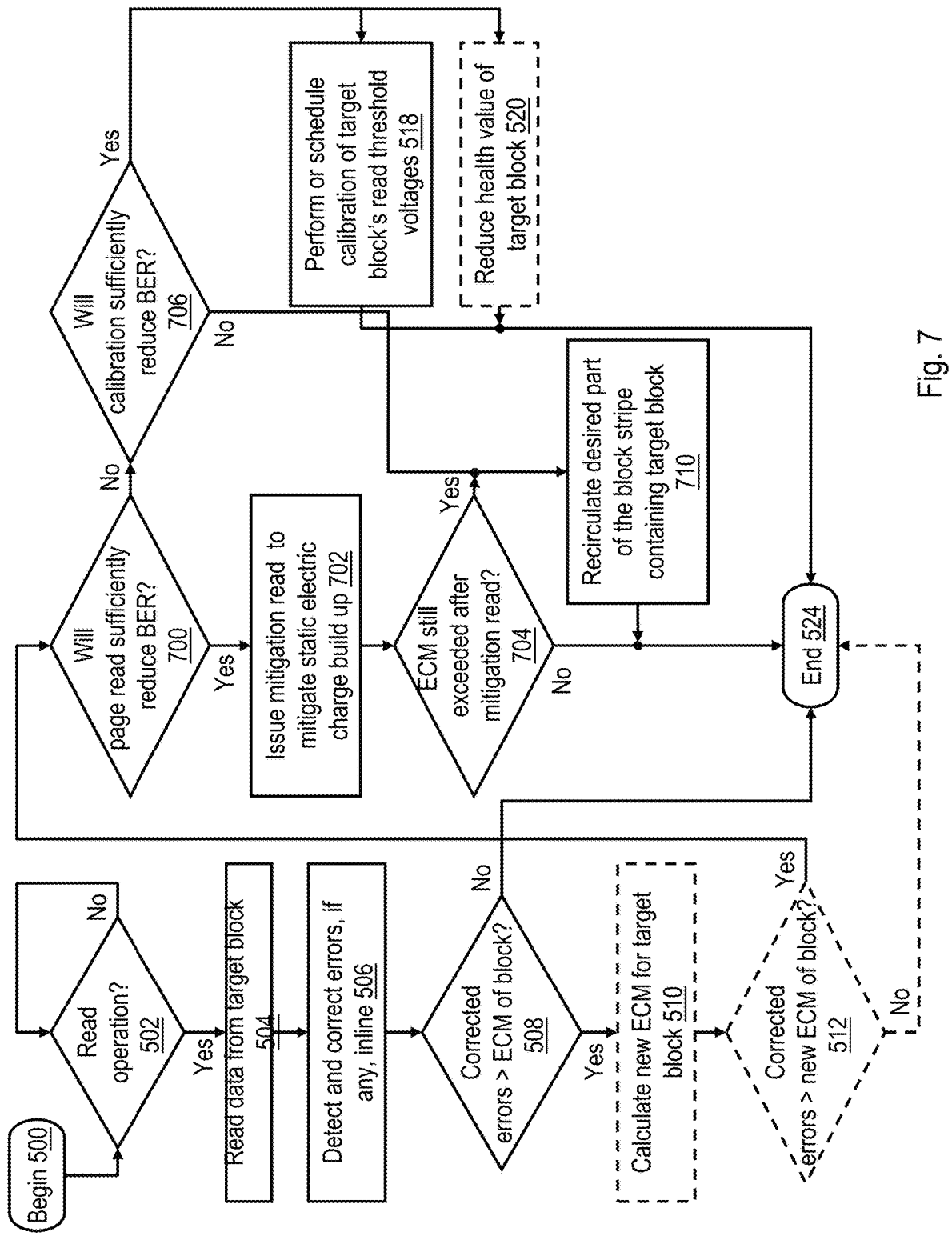
FIG. 7 is a high level logical flowchart of a third exemplary process for mitigating errors when the erase count margin is exceeded in accordance with one embodiment.

With reference now to FIG. 7, there is illustrated a high level logical flowchart of a third exemplary process for mitigating errors when the erase count margin is exceeded in accordance with one embodiment. Again, the process of FIG. 7 can be implemented as an exemplary embodiment of the process given in FIG. 5; accordingly, in FIG. 7, like reference numerals are utilized to identify steps corresponding to those depicted in FIG. 5. Thus, blocks 500-512, 518-520, and 524 correspond to the previously described like-numbered blocks of FIG. 5.

In FIG. 7, in response to an affirmative determination at block 512 (or in response to an affirmative determination at block 508 if optional blocks 510-512 are omitted), flash controller 140 determines at block 700 whether or not performing a dummy read operation directed to a physical page of the target block will sufficiently reduce the BER to meet the ECM for the target block. Flash controller 140 may make the determination illustrated at block 700, for example, based on one or more of characterization data, the amount that the errors exceeded the ECM, and/or one or more components of the current block state information for the target block.

In response to a determination at block 700 that a page read to the target block will not sufficiently reduce the BER to meet the ECM of the target page, the process passes to block 706, which is described below. However, in response to flash controller 140 determining at block 700 that a page read to the target block is likely to reduce the BER enough to satisfy the ECM of the target block, flash controller 140 issues a "dummy" read to a selected physical page of the target block (block 702). As noted above, for 3D NAND flash memory, a read to any physical page of the block can cause a transition of all the physical pages in the block from the FIBS to the LBS in the absence of interference effects from block erases in the same plane. This read is referred to as a "dummy" read in that the data read from the physical page is not used (and is instead discarded). It should further be noted that the BER observed for the physical page during the "dummy" read is not used for calibration purposes since that BER may reflect the temporarily elevated BER of the HBS. In at least some implementations including multi-level NAND flash memory, the "dummy" read may be preferentially directed to a physical page within the selected block that has a degraded bit storage capacity (e.g., from MLC to SLC).

Following the "dummy" read at block 704, flash controller 140 waits for a calibration read wait period, which is a time interval long enough for the selected block to stop exhibiting high BER due to reading after programming, but also short enough to avoid data retention effects. In current 3D NAND flash technology, the calibration read wait period is typically a few seconds or less in duration (e.g., 1 second) and can be determined through characterization of the memory device. After the calibration read wait period has elapsed, the controller again reads one or more physical pages of the target block and determines at block 704 whether or not the ECM of the target block is still exceeded after the "dummy" read has been performed. If not, the process of FIG. 7 ends at block 524; if, however, the ECM is still exceeded, the process passes to block 710, which is described below.

Referring now to block 706, block controller 140 determines whether or not calibration of the read voltage thresholds of the target block will sufficiently reduce the BER to warrant calibration of the target block. Flash controller 140 may make the determination illustrated at block 706, for example, based on one or more of characterization data, the amount that the errors exceeded the ECM, block health metrics 332, and/or block state information. In response to determining at block 706 that calibration of the target block will sufficiently reduce the BER to warrant calibration of the target block, the process of FIG. 7 passes from block 706 to blocks 518-520, which have been described. If, however, flash controller 140 determines at block 706 that calibration will not reduce the BER of the target block enough to warrant calibration of the target block, flash controller 140 relocates a desired part or the entire target block, which for embodiments that allocate memory in block stripes, means that flash controller 140 relocates a desired part or the entire block stripe containing the target block (block 710). Of course, in embodiments in which memory is not allocated on a stipe basis, flash controller 140 can relocate just a desired part or the entire the target block. Following either blocks 518-520 or block 710, the process of FIG. 7 ends at block 524.

As has been described, in at least one embodiment, a controller sets an error count margin for each of multiple units of a non-volatile memory and detects whether the error count margin of any of the multiple units has been exceeded. In response to detecting that the error count margin of a memory unit is exceeded, the controller determines whether calibration of the memory unit would improve a bit error rate of the memory unit sufficiently to warrant calibration. If so, the controller performs calibration of the memory unit. In some implementations, the controller refrains from performing the calibration in response to determining that calibration of the memory unit would not improve the bit error rate of the memory unit sufficiently to warrant calibration, but instead relocates a desired part or all valid data within the memory unit and, if all valid data has been relocated from it, erases the memory unit.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signals per se, and energy per se.

In addition, although embodiments have been described that include use of a NAND flash memory, it should be appreciated that embodiments of the present invention can also be used with any other type of non-volatile random access memory (NVRAM).

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of calibration in a non-volatile memory, the method comprising:
    a controller of the non-volatile memory setting an error count margin for each of multiple units of the non-volatile memory;
    the controller detecting an occurrence of an error event in which the error count margin of any of the multiple units has been exceeded;
    based on detecting the occurrence of an error event in which the error count margin of a memory unit among the multiple memory units is exceeded, the controller determining whether calibration of the memory unit would improve a bit error rate of the memory unit such that the error count margin of the memory unit is not exceeded; and
    the controller mitigating the occurrence of the error event by performing calibration of the memory unit based on determining that calibration of the memory unit would improve the bit error rate of the memory unit such that the error count margin of the memory unit is not exceeded and mitigating the occurrence of the error event by refraining from performing the calibration based on determining that the calibration of the memory unit would not improve the bit error rate of the memory unit such that the error count margin of the memory unit is not exceeded.

2. The method of claim 1, and further comprising:
    based on determining that calibration of the memory unit would not improve the bit error rate of the memory unit such that the error count margin of the memory unit is not exceeded, the controller applying a mitigation strategy for the occurrence of the error event other than calibration.

3. The method of claim 2, wherein the mitigation strategy includes relocating data within the memory unit.

4. The method of claim 3, wherein the mitigation strategy further includes erasing the memory unit.

5. The method of claim 1, wherein:
    the error count margin is a first error count margin; and
    the method further includes:
        based on detecting the occurrence of the error event in which the first error count margin of the memory unit is exceeded and prior to any update of a health value of the memory unit, the controller calculating, on-demand, a new second error count margin for the memory unit based on current state information for the memory unit; and
        the refraining comprises the controller refraining from performing the calibration based on determining that the second error count margin has not been exceeded.

6. The method of claim 1, and further comprising:
    based on determining that calibration of the memory unit would improve the bit error rate of the memory unit such that the error count margin of the memory unit is not exceeded, the controller reducing a health value recorded for the memory unit.

7. The method of claim 1, wherein the detecting includes detecting the occurrence of the error event based on a number of errors detected on a read operation targeting the memory unit.

8. A data storage system, comprising:
    a controller for a non-volatile memory, wherein the controller is configured to:
        set an error count margin for each of multiple units of the non-volatile memory;
        detect an occurrence of an error event in which the error count margin of any of the multiple units has been exceeded;
        based on detecting the occurrence of an error event in which the error count margin of a memory unit among the multiple memory units is exceeded, determine whether calibration of the memory unit would improve a bit error rate of the memory unit such that the error count margin of the memory unit is not exceeded; and
        mitigate the occurrence of the error event by performing calibration of the memory unit based on determining that calibration of the memory unit would improve the bit error rate of the memory unit such that the error count margin of the memory unit is not exceeded and refrain from mitigating the occurrence of the error event by performing the calibration of the memory unit based on determining that calibration of the memory unit would not improve the bit error rate of the memory unit such that the error count margin of the memory unit is not exceeded.

9. The data storage system of claim 8, wherein the controller is further configured to:
    based on determining that calibration of the memory unit would not improve the bit error rate of the memory unit such that the error count margin of the memory unit is not exceeded, relocate data within the memory unit and, if all valid data has been relocated from it, erase the memory unit.

10. The data storage system of claim 8, wherein:
    the error count margin is a first error count margin; and
    the controller is further configured to:
        based on detecting the occurrence of the error event in which the first error count margin of the memory unit is exceeded and prior to any update of a health value of the memory unit, calculate, on-demand, a new second error count margin for the memory unit based on current state information for the memory unit; and
        the controller refrains from performing the calibration based on determining that the second error count margin has not been exceeded.

11. The data storage system of claim 8, wherein the controller is configured to detect the occurrence of the error event based on a number of errors detected on a read operation targeting the memory unit.

12. The data storage system of claim 8, and further comprising the non-volatile memory.

13. A computer program product, the computer program product comprising a computer readable storage medium having program instructions embodied therewith, the program instructions executable by a controller to cause the controller to perform:
    setting an error count margin for each of multiple units of the non-volatile memory;
    detecting an occurrence of an error event in which the error count margin of any of the multiple units has been exceeded;

based on detecting the occurrence of an error event in which the error count margin of a memory unit among the multiple memory units is exceeded, determining whether calibration of the memory unit would improve a bit error rate of the memory unit such that the error count margin of the memory unit is not exceeded; and mitigate the occurrence of the error event by performing calibration of the memory unit based on determining that calibration of the memory unit would improve the bit error rate of the memory unit such that the error count margin of the memory unit is not exceeded and refraining from mitigating the occurrence of the error event by calibration of the memory unit based on determining that calibration of the memory unit would not improve the bit error rate of the memory unit such that the error count margin of the memory unit is not exceeded.

14. The program product of claim 13, wherein the program instructions cause the controller to perform:

based on determining that calibration of the memory unit would not improve the bit error rate of the memory unit such that the error count margin of the memory unit is not exceeded, relocating data within the memory unit and, if all valid data has been relocated from it, erasing the memory unit.

15. The program product of claim 13, wherein:

the error count margin is a first error count margin; and the program instructions cause the controller to perform:

based on detecting the occurrence of the error event in which the first error count margin of the memory unit is exceeded and prior to any update of a health value of the memory unit, calculate, on-demand, a new second error count margin for the memory unit based on current state information for the memory unit; and the refraining comprises refraining from performing the calibration based on determining that the second error count margin has not been exceeded.

16. The program product of claim 13, wherein the program instructions cause the controller to perform:

based on determining that calibration of the memory unit would improve the bit error rate of the memory unit such that the error count margin of the memory unit is not exceeded, reducing a health value recorded for the memory unit.

17. The program product of claim 13, wherein the detecting includes detecting the occurrence of the error event based on a number of errors detected on a read operation targeting the memory unit.

\* \* \* \* \*